(12) United States Patent
Christensen et al.

(10) Patent No.: US 8,432,269 B2
(45) Date of Patent: Apr. 30, 2013

(54) SYSTEM AND METHOD FOR DISABLING A VEHICLE

(75) Inventors: Jeffrey P. Christensen, Clinton Township, MI (US); Michael D. Solomon, Novi, MI (US); Carl J. Hering, Farmington Hills, MI (US); Ryan M. Edwards, Macomb, MI (US); Jason J. Parks, White Lake, MI (US); Travis L. Bradburn, Ortonville, MI (US); Laura R. Chmielewski, Huntington Woods, MI (US)

(73) Assignee: General Motors LLC, Detroit, MI (US)

( * ) Notice: Subject to any disclaimer, the term of this patent is extended or adjusted under 35 U.S.C. 154(b) by 572 days.

(21) Appl. No.: 12/635,254

(22) Filed: Dec. 10, 2009

(65) Prior Publication Data

US 2011/0140871 A1 Jun. 16, 2011

(51) Int. Cl.
*B60R 25/10* (2006.01)
(52) U.S. Cl.
USPC .................. 340/426.11; 340/426.12; 340/438; 340/439; 340/901; 340/905; 340/988; 340/989; 455/418; 455/420; 701/33.1; 701/34.4; 701/36; 701/37

(58) Field of Classification Search ............. 340/426.11, 340/426.12, 438, 439, 901, 905, 988, 989; 455/418, 420; 701/33, 34.4, 36, 70
See application file for complete search history.

(56) References Cited

U.S. PATENT DOCUMENTS

| | | | |
|---|---|---|---|
| 6,249,215 B1 * | 6/2001 | Dilz et al. | 340/426.12 |
| 6,900,723 B2 * | 5/2005 | Yamanaka et al. | 340/426.1 |
| 7,224,261 B2 * | 5/2007 | Shimomura | 340/426.11 |
| 2005/0125110 A1 | 6/2005 | Potter et al. | |
| 2007/0273489 A1 * | 11/2007 | Tauchi et al. | 340/426.11 |
| 2008/0071546 A1 | 3/2008 | Beiermeister et al. | |
| 2008/0275604 A1 | 11/2008 | Perry et al. | |
| 2009/0167524 A1 | 7/2009 | Chestnutt et al. | |
| 2009/0248222 A1 | 10/2009 | McGarry et al. | |

* cited by examiner

*Primary Examiner* — Tai T Nguyen
(74) *Attorney, Agent, or Firm* — Ingrassia Fisher & Lorenz, P.C.

(57) ABSTRACT

Systems and methods are provided for disabling a vehicle. An exemplary system includes, but is not limited to an antenna that is adapted to be attached to the vehicle. The antenna is configured to transmit and receive communication transmissions. A telematics unit is communicatively connected to the antenna. The telematics unit is adapted for attachment to the vehicle and is configured to communicatively connect to a necessary sub-system of the vehicle, to receive telecommunications from a user through the antenna, and to disable the necessary sub-system in response to receiving an instruction from the user to disable the vehicle.

17 Claims, 4 Drawing Sheets

SYSTEM AND METHOD FOR DISABLING A VEHICLE

TECHNICAL FIELD

The technical field generally relates to vehicles and more particularly relates to systems and methods for disabling vehicles.

BACKGROUND

Some vehicle fleet owners, lessees, or others persons having responsibility for the control of a fleet of vehicles may desire to render the vehicles in their fleet inoperable at certain times, during certain time periods, or when certain conditions are met. For example, a vehicle fleet owner, such as a government entity that provides its employees with government owned vehicles for the purpose of performing work related functions may wish to ensure that its employees do not use the government owned vehicles for personal usage after duty hours. Other vehicle fleet owners, for example, trucking companies that provide large over-the-road trucks to drivers for the purpose of delivering goods to distant customers may wish to ensure that the trucks are not operated for longer than a predetermined number of hours during a work day. Still other vehicle owners, such as taxi-cab companies, may wish to preclude their employees from driving the company owned vehicles beyond a defined geographical boundary.

Owners, lessees or other persons responsible for the control of an individual vehicle may similarly desire to render vehicle in their charge inoperable at certain times or when certain conditions are met. For example, the parents of a teenage driver may wish to ensure that a vehicle provided to the teenage driver is inoperable after a curfew or during a period of time when the parents will be away from the home. In other examples, vehicle owners may wish to render their vehicles inoperable during periods when the vehicle owners will not be driving the vehicle. For instance, when the vehicle owner parks the vehicle in a shopping mall parking lot, he or she may wish to render the vehicle inoperable for the period of time that the owner is inside of the shopping mall. In yet another example, a vehicle owner who leaves his or her vehicle in a long term parking lot at an airport while the vehicle owner travels by airplane to a distant location may desire to ensure that the vehicle cannot be driven while he or she is away.

Some existing systems, such as alarm systems, may disable a vehicle's ignition. However, if the ignition can be circumvented, the vehicle may still be operable. Other existing systems may merely monitor vehicle usage without preventing unauthorized vehicle usage. Accordingly, it is desirable to provide a system that permits a vehicle owner to control and/or prevent unauthorized vehicle usage. Furthermore, other desirable features and characteristics will become apparent from the subsequent detailed description and the appended claims, taken in conjunction with the accompanying drawings and the foregoing technical field and background.

SUMMARY

Systems and methods are disclosed herein for disabling a vehicle. In a first non-limiting example, a system for disabling a vehicle includes, but is not limited to, an antenna that is adapted for attachment to the vehicle. The antenna is configured to transmit and receive communication transmissions. A telematics unit is communicatively connected to the antenna and is adapted for attachment to the vehicle. The telematics unit is configured to communicatively connect to a necessary sub-system of the vehicle, to receive telecommunications from a user through the antenna, and to disable the necessary sub-system in response to receiving an instruction from the user to disable the vehicle. In this first, non-limiting example, the instruction from the user to disable the vehicle includes, but is not limited to, a temporal criterion specified by the user for disabling the vehicle. The telematics unit is further configured to automatically disable the necessary sub-system when the temporal criterion is satisfied.

In a second non-limiting example, a system for disabling a vehicle includes, but is not limited to, a call center, an antenna, and a telematics unit. The antenna is adapted for attachment to the vehicle and is configured to transmit and receive telecommunication transmissions to and from the call center. The telematics unit is communicatively connected to the antenna and is adapted for attachment to the vehicle. The telematics unit is configured to communicatively connect to a necessary sub-system of the vehicle, to receive communications from a user through the antenna, and to disable the necessary sub-system in response to receiving an instruction from the user to disable the vehicle. In this second, non-limiting example, the instruction from the user to disable the vehicle includes, but is not limited to, a temporal criterion specified by the user for disabling the vehicle. The telematics unit is further configured to automatically disable the necessary sub-system when the temporal criterion is satisfied.

In a third non-limiting example, a method for disabling a vehicle that requires a necessary sub-system for operation includes, but is not limited to, receiving at a telematics unit an instruction originating from a user to disable the vehicle. The instruction includes, but is not limited to, a criterion that is specified by the user. The method further includes disabling the necessary sub-system of the vehicle when the criterion is satisfied.

DESCRIPTION OF THE DRAWINGS

One or more examples will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

One solution to the problems discussed above is to provide a system for disabling a vehicle which allows a user to disable a single vehicle and/or multiple vehicles by rendering a necessary sub-system of the vehicle inoperable. As used herein the term "user" refers to a person who is an owner, an operator, a telematics service subscriber, or another person associated with the vehicle or who is otherwise authorized to issue commands to disable the vehicle. Also, as used herein, the term "necessary sub-system" refers to any assembly, controller, software, system, sub-system, apparatus, or device mounted to the vehicle that is essential to the operation of the vehicle and without which the vehicle cannot be operated. For example, and without limitation, a vehicle's engine, an engine control module, a powertrain control module, and a fuel system are necessary sub-systems Such a system for disabling a vehicle includes, but is not limited to, a telematics unit that may be mounted to the vehicle(s) and an antenna that is also may be mounted to the vehicle(s) and which is communicatively connected to the telematics unit. The antenna is designed, constructed and positioned to receive communication signals and/or transmissions and to forward such signals and transmissions to the telematics unit. The telematics unit is communicatively connected to a necessary sub-system of the vehicle and is programmed to transmit instructions to the necessary sub-system that disable the necessary sub-system when the telematics unit receives instructions to do so.

A user may transmit instructions to the telematics unit from a remote location using telephonic communications, by accessing an internet website and/or by direct interaction with the telematics unit itself. In some instances, such as when the user utilizes telephonic communications and/or an Internet website to transmit such instructions to the telematics unit, the instructions may be routed through a call center that is configured to receive such instructions from the user and to transmit such instructions to the telematics unit. In other examples, such as when the user interacts directly with the telematics unit, the user may be collocated with the vehicle.

The system for disabling a vehicle may be configured to define criteria which the telematics unit may use to determine when to disable the necessary sub-system. For example, the user may identify specific hours of a day or specific days of a week when the vehicle is to be rendered inoperative. The telematics unit may monitor conditions, its own sub-systems, and/or other vehicle sub-systems to determine if/when such criteria are fulfilled and may disable the necessary sub-system at that time.

A greater understanding of the examples of the systems and methods disclosed herein may be obtained through a review of the illustrations accompanying this application together with a review of the detailed description that follows.

Figure 1:
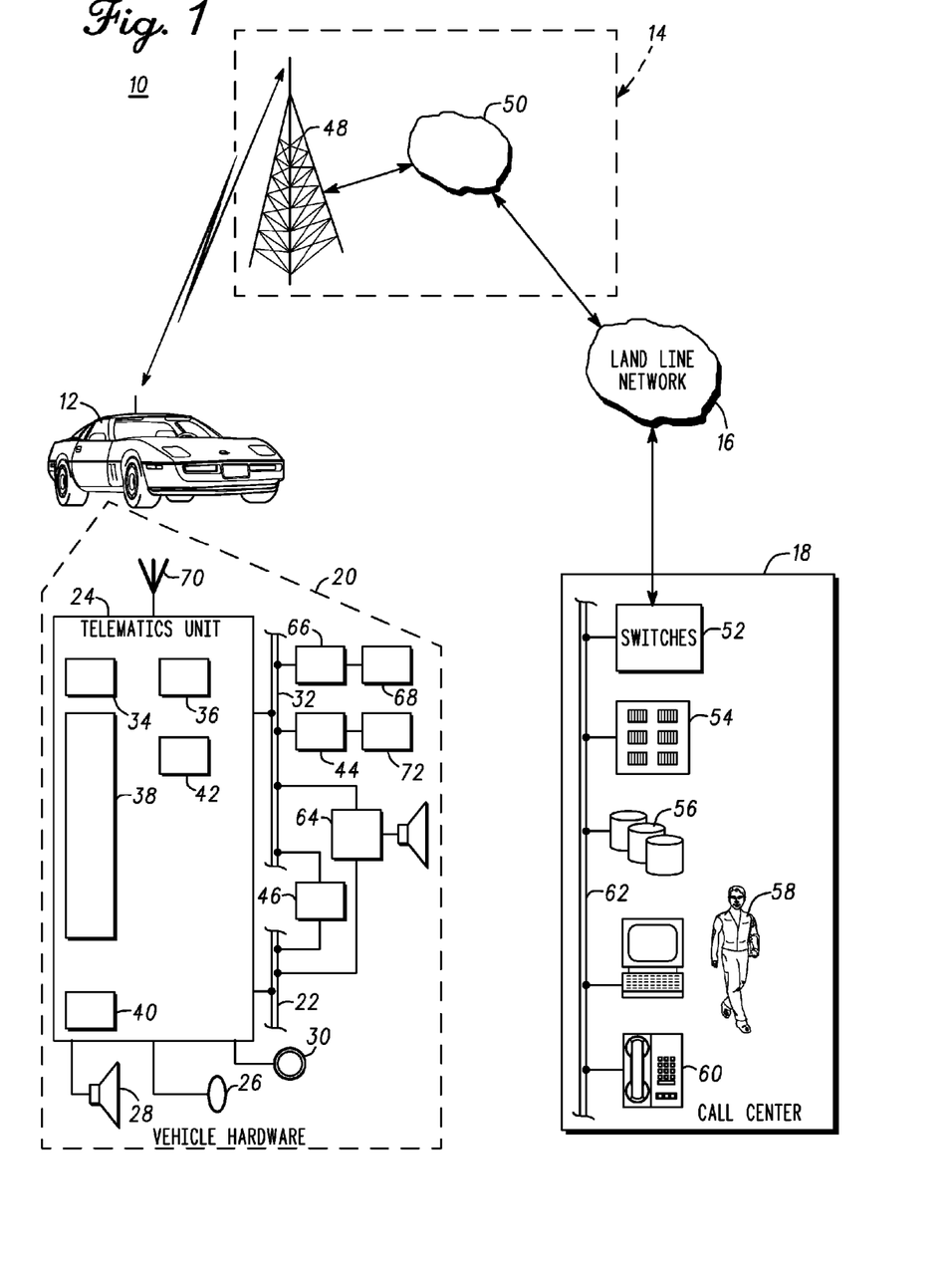
FIG. 1 is a schematic view illustrating a non-limiting example of a communication system suitable for use with the examples of systems and methods disclosed herein for disabling a vehicle disclosed herein.

With reference to FIG. 1, there is shown a non-limiting example of a communication system 10 that may be used together with the system and method disclosed herein for disabling a vehicle. The communication system generally includes a vehicle 12, a wireless carrier system 14, a land network 16 and a call center 18. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated communication system 10, are not intended to be limiting.

Vehicle 12 may be any type of mobile vehicle such as a motorcycle, car, truck, recreational vehicle (RV), boat, plane, etc., and is equipped with suitable hardware and software that enables it to communicate over communication system 10. Some of the vehicle hardware 20 is shown generally in FIG. 1 including a telematics unit 24. The example of FIG. 1 also shows a microphone 26, a speaker 28, and buttons and/or controls 30 connected to the telematics unit 24. Operatively coupled to the telematics unit 24 in this example is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the call center 18. In the example shown in FIG. 1, telematics unit is shown to include an electronic processing device 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within processing device 38. Other examples may provide different or additional features, as desired.

In various examples, the telematics unit 24 may provide one or more additional services such as: turn-by-turn directions and other navigation-related services provided in conjunction with the GPS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit may be capable of offering in some examples; other examples may provide any subset of these features, or none of these features at all. Further, telematics unit 24 may include a number of additional components in addition to and/or different components from those listed above.

Some examples may use radio transmissions to establish a voice channel with wireless carrier system 14 so that both voice and data transmissions can be sent and received over the voice channel. Vehicle communications may be enabled via the cellular chipset/component 34 for voice communications and the wireless modem 36 for data transmission. In order to enable successful data transmission over the voice channel, wireless modem 36 applies some type of encoding or modulation to convert the digital data so that it can be communicated through a vocoder or speech codec incorporated in the cellular chipset/component 34. Any suitable encoding or modulation technique that provides an acceptable data rate and bit error can be used with the present examples. Dual mode antenna 70 services the GPS chipset/component 42 and the cellular chipset/component 34.

Microphone 26 provides the driver or other vehicle occupant with a mechanism for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the components of vehicle hardware 20. For example, one of the buttons and/or controls 30 can be an electronic push-button used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32. Example vehicle sensors include but are not limited to gyroscopes, accelerometers, magnetometers, emission detection, and/or control sensors, and the like. Example sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cell towers 48, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14. For example, a base station and a cell tower could be co-located at the same site or they could be remotely located, and a single base station could be coupled to various cell towers or various base stations could be coupled with a single MSC, to list but a few of the possible arrangements. A speech codec or vocoder may be incorporated in one or more of the base stations, but depending on the particular architecture of the wireless network, it could be incorporated within a Mobile Switching Center or some other network components as well.

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either the live advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a manned call center 18, it will be appreciated that the call center 18 can be any central or remote facility, manned or unmanned, mobile or fixed, to or from which it is desirable to exchange voice and data.

Figure 2:
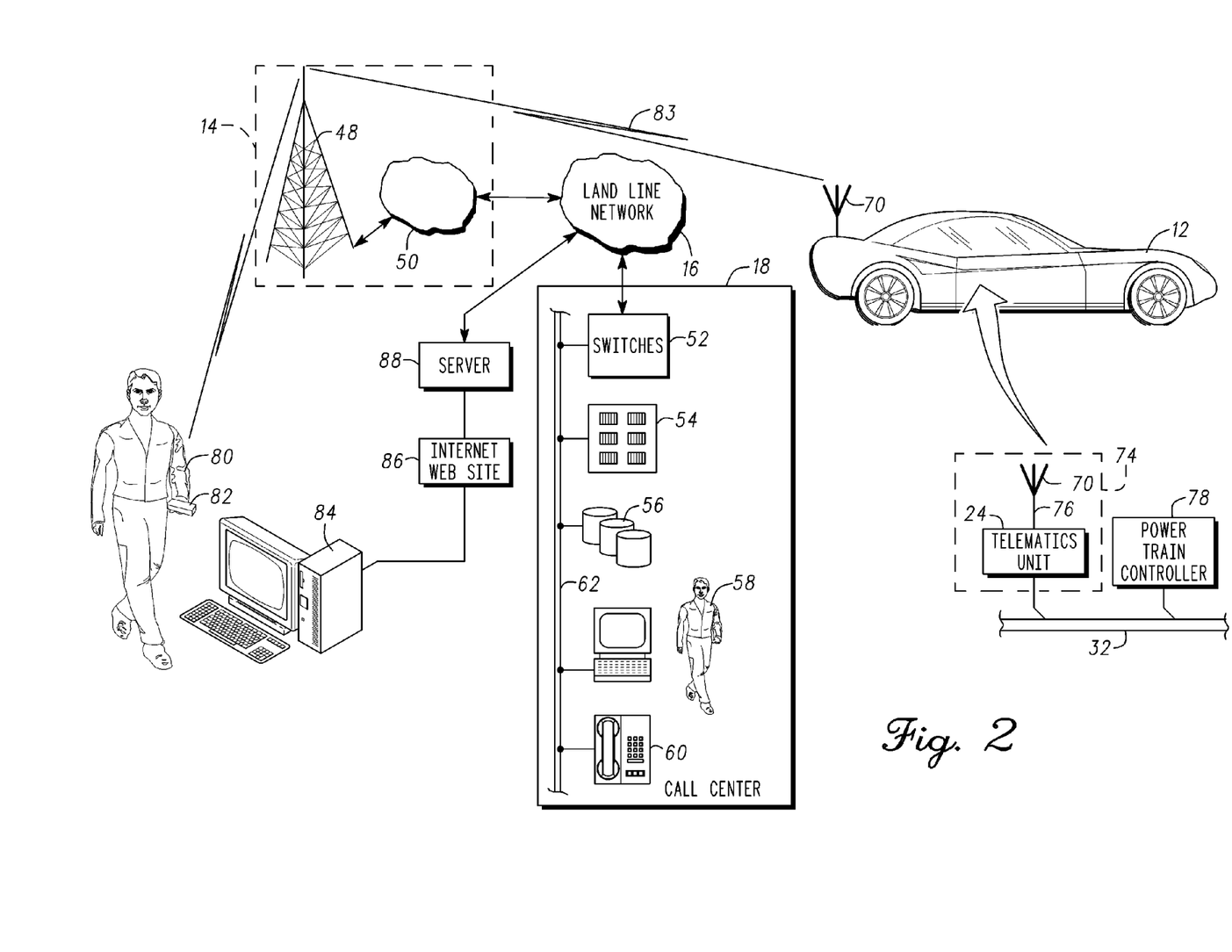
FIG. 2 is a schematic view illustrating a non-limiting example of a system for disabling a vehicle and non-limiting implementations thereof for disabling the vehicle from a remote location.

With respect to FIG. 2, a non-limiting example of a system 74 for disabling a vehicle is schematically illustrated. System 74 includes telematics unit 24 and dual mode antenna 70. In other examples, system 74 further includes call center 18. As described in detail above, dual mode antenna 70 is configured to receive electromagnetic signals from wireless carrier system 14. In this manner, dual mode antenna 70 may receive transmissions from, and may send transmissions to, call center 18. Telematics unit 24, as discussed in detail above, is configured to provide a wide variety of services to a driver of vehicle 12.

Telematics unit 24 and dual mode antenna 70 are each mounted to vehicle 12 and are communicatively connected to one another in any manner, such as using a suitable lead 76. Lead 76 may be implemented with, for example, a coaxial cable or any other type of waveguide or transmission line effective to convey signals between telematics unit 24 and dual mode antenna 70. Other examples may facilitate communications between telematics unit 24 and dual mode antenna 70 in any other manner.

In various examples, telematics unit 24 is further connected to allow communications with one or more components or systems of vehicle 12. Telematics unit 24 may be communicatively coupled to vehicle bus 32, for example, which, in turn, links telematics unit to multiple systems of vehicle 12 that are also connected to vehicle bus 32. One such system connected to vehicle bus 32 is necessary sub-system 78. In the illustrated example, necessary sub-system 78 is a powertrain controller. In other examples, telematics unit 24 may be connected directly to necessary sub-system 78 while in other examples, telematics unit 24 may be indirectly connected to necessary sub-system 78 through an intervening system or sub-system such as a vehicle central processing unit (not shown).

The communicative connection between telematics unit 24 and necessary sub-system 78 permits telematics unit 24 to communicate instructions to necessary sub-system 78. One such instruction may be an instruction to enter an inactive mode or to otherwise cease functioning. Necessary sub-system 78 is configured to shut down, cease functioning, or to otherwise become disabled when necessary sub-system receives the instruction from telematics unit 24 to cease functioning. In some examples, such disablement may take the form of a mechanical inability to function. In other examples, the necessary sub-system may be rendered inoperative by a controller that controls necessary sub-system and that is programmed to disable necessary sub-system 78 in response to the instruction from telematics unit 24. When necessary sub-system 78 ceases to function, vehicle 12 is rendered inoperative. In some examples, when vehicle 12 is rendered inoperative, its motor may be precluded from turning on. In other examples, when vehicle 12 is rendered inoperative, its transmission may be precluded from moving into gear. In still other examples, when vehicle 12 is rendered inoperative, its braking system may retard motion of the vehicle or completely inhibit motion of the vehicle. In still other examples, when vehicle 12 is rendered inoperative, it is in some other way made incapable of functioning normally.

In some examples, the instruction to cease functioning may take effect immediately and vehicle 12 will, if currently operating, shut down or otherwise become inoperative. In other examples, the instruction to cease functioning will not take immediate effect, but rather, will be delayed until the next time vehicle 12 is turned off. Once vehicle 12 has been turned off, necessary sub-system 78 will be disabled and a person will be incapable of restarting vehicle 12 with a car key, a remote starter, or in any other manner. Necessary sub-system 78 may be further configured to remain disabled until an instruction is sent by telematics unit 24 re-activating or re-enabling necessary sub-system 78.

FIG. 2 also depicts various non-limiting implementations of system 74 that demonstrate a user 80 disabling vehicle 12 from a location that is remote from vehicle 12. In a first implementation, user 80 uses a wireless telephone 82 to disable vehicle 12. To do so, user 80 places a telephone call to call center 18 and instructs advisor 58 to disable vehicle 12 or to disable a plurality of vehicles associated with user 80 (hereinafter, the "associated vehicles"). Advisor 58, in turn, transmits a disabling instruction 83 to vehicle 12 and/or to the associated vehicles. The disabling instruction is received by dual mode antenna 70 and conveyed to telematics unit 24 which in turn sends an instruction to necessary sub-system 78 to cease functioning. When this instruction is received by necessary sub-system 78, vehicle 12 is rendered inoperative.

In some examples, before transmitting the disabling instruction, advisor 58 may request a Personal Identification Number (PIN) or a password to confirm that the person issuing the instruction is user 80 or is otherwise authorized to disable vehicle 12. In other examples, other security measures may be employed, including, but not limited to, the use of biometric identification such as a voice print or a finger print to confirm the identity of the person requesting disablement, or the advisor may conduct an interview with the person making the request to confirm information unique to user 80. In other examples, any other security measure that is effective to confirm the identity of the person making the request or to confirm their authorization to make the request may also be employed.

During the phone call with call center 18, or at any time thereafter, user 80 may provide advisor 58 with a set of criteria that is to be used to determine when to disable vehicle 12 or the associated vehicles. For example, user 80 may specify that vehicle 12 and/or the associated vehicles are to be disabled if their engines have been on for a period of time equal to a specified number of hours during a single day. In this example, telematics unit 24 may be configured to monitor the engine directly or to monitor an engine controller across vehicle bus 32 or through any other communicative connection. When telematics unit 24 determines that an hour limit for any given day has been exceeded, telematics unit 24 may send a disabling command to necessary sub-system 78 which, in turn, disables vehicle 12.

In another example, user 80 may specify times of day, days of a week, dates during a year, and/or any combination thereof during which vehicle 12 or the associated vehicles are to be disabled. In this example, telematics unit 24 can be configured to monitor a master clock for vehicle 12 across vehicle bus 32, or through a direct connection therewith, or telematics unit 24 may monitor a clock internal to telematics unit 24 if so equipped, to determine when the specified times and dates occur and to automatically transmit the disabling command to necessary sub-system 78 at such times and dates.

In another example, user 80 may specify a particular geographic boundary for operation of vehicle 12 or for operation of each of the associated vehicles. In this example, telematics unit 24 may monitor a navigation system of vehicle 12 or may utilize GPS chipset/component 42 or may utilize/communicate with other systems to monitor the location of vehicle 12. In this example, telematics unit 24 will transmit the disabling command when it determines that vehicle 12 has exceeded the boundary specified by user 80.

In still other examples, user 80 may specify any other type of criteria for disabling vehicle 12 and/or the associated vehicles and telematics unit 24 may be configured to monitor systems and subsystems of vehicle 12 or systems and subsystems of telematics unit 24 to determine whether and when such criteria are satisfied. Upon the fulfillment of user specified criteria, telematics unit 24 may transmit the disabling command to necessary sub-system 78 to disable vehicle 12.

In a second implementation of system 74 wherein user 80 remotely disables vehicle 12 or the associated vehicles, user 80 may utilize a computer 84 to disable the vehicle(s) over the Internet. Although computer 84 is depicted as a desk top computer in FIG. 2, it should be understood that any type of computer or other processor, microprocessor, or device that is configured to access the internet, such as a main frame computer, a lap top computer, a wireless phone and/or a hand held device may also be utilized.

Using computer 84, user 80 accesses an Internet website 86. Internet website 86 is operatively connected to a server 88. In the illustrated example, server 88 is communicatively connected to call center 18 through land network 16. In other examples, server 88 may be connected to wireless carrier system 14. In still other examples, server 88 may be located at call center 18.

Internet website 86 is configured to interface with user 80 and to enable user 80 to send an instruction to call center 18 to disable and to enable vehicle 12. Internet website 86 may be programmed to include security measures, such as requiring a PIN, a password, or any other measure to sufficient to confirm the identity/authorization of the person making the request.

Internet website 86 may also be configured to permit user 80 to specify criteria for telematics unit 24 to use to determine when to disable vehicle 12. These instructions may then be transmitted by call center 18 to system 74 which will act to disable vehicle 12, either immediately or when specified criteria are fulfilled.

Figure 3:
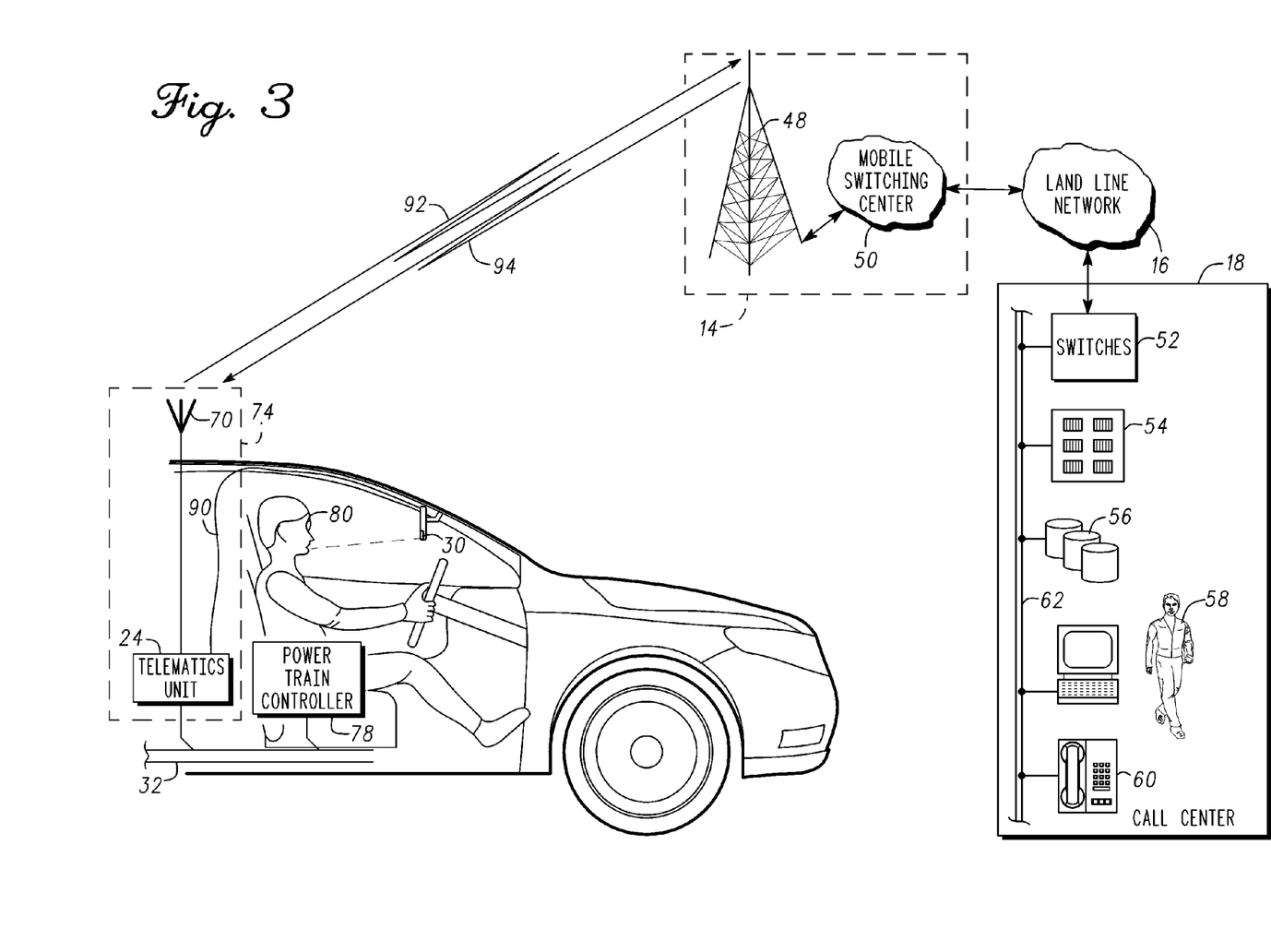
FIG. 3 is a schematic view illustrating the system of FIG. 2 and non-limiting implementations thereof for disabling the vehicle while the user is collocated with the vehicle.

With respect to FIG. 3, two additional non-limiting implementations of system 74 are schematically illustrated. In FIG. 3, user 80 uses system 74 to disable vehicle 12 while user 80 is collocated with vehicle 12. In a first implementation, user 80 transmits instructions to disable vehicle 12 through call center 18. User 80 actuates buttons and/or controls 30 to initiate contact with an advisor 58 at call center 18. By depressing button and/or control 30, a signal is transmitted along lead 90 to telematics unit 24 indicative of a desire by user 12 to contact call center 18. A signal 92 is transmitted to cell tower 48 and then on to call center 18 where user 12 may be connected to advisor 58.

Once user 80 has established contact with advisor 58, user 80 may instruct advisor 58 to disable vehicle 12 or may provide advisor 58 with criteria for disabling vehicle 12 in the manner discussed above with respect to FIG. 2. Advisor 58 may then send a disabling signal 94 to system 74 which is received by antenna 70 and conveyed to telematics unit 24 for action.

In a second implementation of system 74 for disabling vehicle 12 while user 80 is collocated with vehicle 12, user 80 may communicate with telematics unit 24 without such communications being transmitted to or through call center 18 and/or advisor 58. In this implementation, telematics unit 24 is programmed to interact with user 80 using an Interactive Voice Response (IVR). As used herein, the term "IVR" refers to a system wherein telematics unit 24 is programmed with voice recognition software and other software applications that permit vehicle hardware 20 (see FIG. 1) to engage user 80 in conversation. Accordingly, by speaking commands into microphone 26, user 80 can interact with telematics unit 24 without needing to route transmissions through call center 18 and/or advisor 58.

Telematics unit 24 can also be programmed to solicit a PIN or a password from user 80 or to execute any other applicable security measure to ensure that the person uttering the command to disable vehicle 12 is user 80 or is otherwise authorized to disable vehicle 12. Telematics unit 24 may further be programmed and configured to receive an instruction to disable vehicle 12 and may be further configured to receive user specified criteria for disabling vehicle 12.

Figure 4:
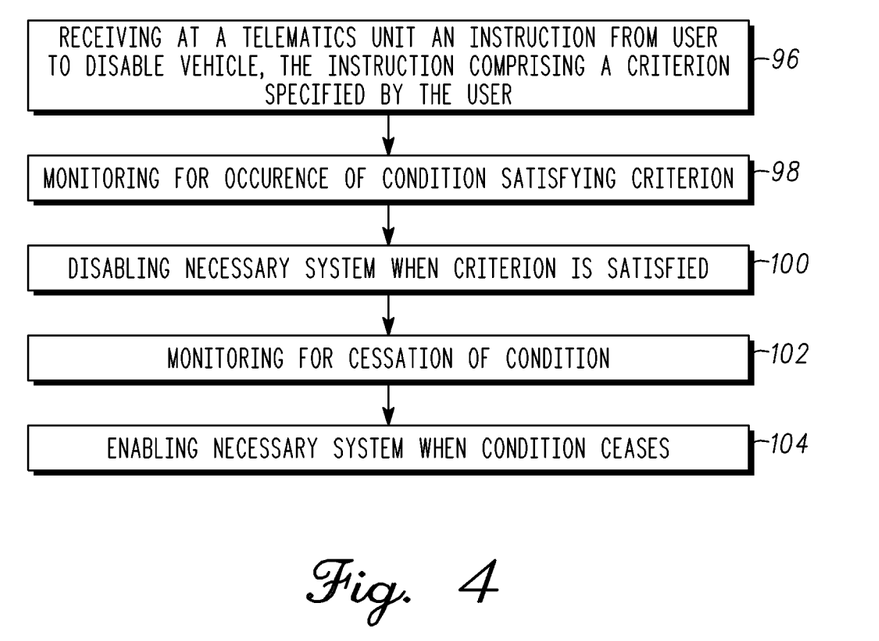
FIG. 4 is a flow chart illustrating a non-limiting example of a method for disabling a vehicle.

With respect to FIG. 4, a method for disabling vehicle 12 is illustrated. At step 96, telematics unit 24 receives an instruction, originating from user 80, to disable vehicle 12. As discussed above, the instruction to disable vehicle 12 may arrive in any of several different ways, including being routed through call center 18 or coming directly to telematics unit 24 from user 80 through an IVR system. The instruction may comprise a command to immediately disable vehicle 12 or may comprise a set of criteria which, if/when fulfilled, will trigger telematics unit 24 to transmit an instruction disabling necessary sub-system 78.

At step 98, telematics unit 24 monitors vehicle conditions to determine if/when the criteria for disabling vehicle 12 have been satisfied. Telematics unit 24 may monitor other systems of vehicle 12, such as a central processing unit that controls vehicle function, to determine if/when the user specified criteria have been satisfied. Alternatively, telematics unit 24 may monitor other components of vehicle hardware 20, such as GPS chipset/component 42, to determine if/when the user specified criteria have been satisfied.

At step 100, the user specified criteria have been satisfied and telematics unit 24 transmits an instruction to necessary sub-system 78 that renders necessary sub-system 78 inoperative. In some examples, the instruction to become inoperative will not take effect until vehicle 12 has been turned off. In such cases, necessary sub-system 78 will become inoperative once vehicle 12 has been turned off and will remain inoperative until it receives an instruction from telematics unit 24 re-activating or re-enabling it.

At step 102, telematics unit 24 monitors vehicle conditions to determine if/when the criteria for disabling vehicle 12 cease to be fulfilled. For example, if vehicle 12 has been disabled because the vehicle's engine has been operated for a period of time that exceeds a time restriction for a single day, then when the next day begins, the criteria resets.

At step 104, after the user specified criteria becomes unfulfilled, telematics unit 24 sends a command to necessary sub-system 78 that reactivates necessary sub-system 78 and which enables operation of vehicle 12.

In various examples, steps 96 through 104 have been described as being performed by telematics unit 24. In other examples, these steps may be executed by equipment located at call center 18 including, but not limited to, servers 54 and/or telecommunication/computer equipment 60. In still other examples, steps 96 through 104 may be executed through cooperation between call center 18 and telematics unit 24.

While at least one example has been presented in the foregoing detailed description, it should be appreciated that a vast number of variations exist. It should also be appreciated that the examples discussed are not intended to limit the scope, applicability, or configuration in any way. Rather, the foregoing detailed description will provide those skilled in the art with a convenient road map for implementing the examples. It should be understood that various changes can be made in the function and arrangement of elements without departing from the scope as set forth in the appended claims and the legal equivalents thereof.

What is claimed is:

1. A system for disabling a vehicle, the system comprising:
an antenna adapted for attachment to the vehicle, the antenna configured to transmit and receive communication transmissions; and
a telematics unit communicatively connected to the antenna, the telematics unit being adapted for attachment to the vehicle and configured to:
communicatively connect to a necessary sub-system of the vehicle,
receive telecommunications from a user through the antenna, and
disable the necessary sub-system in response to receiving an instruction from the user to disable the vehicle,
wherein the instruction from the user to disable the vehicle comprises a temporal criterion specified by the user for disabling the vehicle and wherein the telematics unit is further configured to automatically disable the necessary sub-system when the temporal criterion is satisfied, and
wherein the instruction from the user to disable the vehicle further comprises a geographic restriction specified by the user for disabling the vehicle and wherein the telematics unit is further configured to automatically disable the necessary sub-system when the geographic restriction is exceeded by the vehicle.

2. The system of claim 1, wherein the telematics unit is further configured to disable the necessary sub-system by inhibiting the necessary sub-system from functioning when attempts are made by a person to start the vehicle.

3. The system of claim 1, wherein the telematics unit is further configured to receive the instruction from the user through an Interactive Voice Response interface.

4. The system of claim 1, wherein the necessary sub-system is a powertrain controller module.

5. The system of claim 1, wherein the temporal criterion comprises one of a time restriction, a data restriction and a restriction on total hours of engine operation during a specified time period.

6. The system of claim 1, wherein the telematics unit is further configured to require satisfaction of a security measure before the telematics unit will disable the necessary sub-system.

7. A system for disabling a vehicle, the system comprising:
a call center;
an antenna adapted for attachment to the vehicle, the antenna configured to transmit and receive communication transmissions to and from the call center; and
a telematics unit communicatively connected to the antenna, the telematics unit being adapted for attachment to the vehicle and configured to:
communicatively connect to a necessary sub-system of the vehicle,
receive telecommunications from a user through the antenna, and
disable the necessary sub-system in response to receiving an instruction from the user to disable the vehicle,
wherein the instruction from the user to disable the vehicle comprises a temporal criterion specified by the user for disabling the vehicle and wherein the telematics unit is further configured to automatically disable the necessary sub-system when the temporal criterion is satisfied, and
wherein the temporal criterion comprises one of a time restriction, a date restriction and a restriction on total hours of engine operation during a specified time period, and
wherein the instruction from the user to disable the vehicle further comprises a geographic restriction specified by the user for disabling the vehicle and wherein the telematics unit is further configured to automatically disable the necessary sub-system when the geographic restriction is exceeded by the vehicle.

8. The system of claim 7, wherein the telematics unit is further configured to disable the necessary sub-system by inhibiting the necessary sub-system from functioning when attempts are made by a person to start the vehicle.

9. The system of claim 7, wherein the telematics unit is further configured to receive the instruction from the user through an Interactive Voice Response interface.

10. The system of claim 7, wherein the call center is configured to receive the instruction to disable the vehicle from the user and to communicate the instruction to disable the vehicle to the telematics unit.

11. The system of claim 10, the system further comprising an Internet website communicatively connected to the call center, the Internet website being configured to receive the instruction to disable the vehicle from the user and to transmit the instruction to disable the vehicle to the call center.

12. The system of claim 7, wherein the necessary sub-system is a powertrain controller module.

13. The system of claim 7, wherein the telematics unit is further configured to require satisfaction of a security measure before it can disable the necessary sub-system.

14. The system of claim 13, wherein the security measure comprises requiring one of a PIN and a password.

15. A method for disabling a vehicle that requires a necessary sub-system for operation, the method comprising the steps of:
receiving at a telematics unit an instruction originating from a user to disable the vehicle, the instruction comprising a temporal criterion specified by the user, the temporal criterion comprising one of a time restriction, a date restriction and a restriction on total hours of engine operation during a specified time period, and the instruction further comprising a geographic restriction specified by the user for disabling the vehicle and wherein the telematics unit is further configured to automatically disable the necessary sub-system when the geographic restriction is exceeded by the vehicle; and
disabling the necessary sub-system of the vehicle when the criterion is satisfied.

16. The method of claim 15, the method further comprising the steps of:
monitoring for an occurrence of a condition that satisfies the criterion; and
disabling the necessary sub-system when the condition is present.

17. The method of claim 16 further comprising the steps of:
monitoring for a cessation of the condition that satisfies the criterion; and
enabling the necessary sub-system when the condition has ceased.

* * * * *